United States Patent
Belschner

(10) Patent No.: US 9,954,360 B2
(45) Date of Patent: Apr. 24, 2018

(54) ENERGY STORE FOR A PHOTOVOLTAIC SYSTEM, ENERGY STORAGE POWER PLANT, CONTROL DEVICE, AND METHOD FOR OPERATING AN ENERGY STORE

(71) Applicant: Robert Bosch GmbH, Stuttgart (DE)

(72) Inventor: Werner Belschner, Michelbach an der Bilz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 480 days.

(21) Appl. No.: 13/942,001

(22) Filed: Jul. 15, 2013

(65) Prior Publication Data

US 2014/0021783 A1  Jan. 23, 2014

(30) Foreign Application Priority Data

Jul. 19, 2012 (DE) ................. 10 2012 212 654

(51) Int. Cl.

| | |
|---|---|
| H02J 1/14 | (2006.01) |
| H02J 3/00 | (2006.01) |
| H01M 10/44 | (2006.01) |
| H01M 10/46 | (2006.01) |
| H02J 3/32 | (2006.01) |
| H02J 3/38 | (2006.01) |
| H02J 7/35 | (2006.01) |
| H01M 10/06 | (2006.01) |
| H02J 7/00 | (2006.01) |
| H01M 10/0525 | (2010.01) |

(52) U.S. Cl.
CPC .............. *H02J 3/00* (2013.01); *H01M 10/441* (2013.01); *H01M 10/465* (2013.01); *H02J 1/14* (2013.01); *H02J 3/32* (2013.01); *H02J 3/383* (2013.01); *H02J 7/35* (2013.01); *H01M 10/0525* (2013.01); *H01M 10/06* (2013.01); *H01M 2220/10* (2013.01); *H02J 2007/005* (2013.01); *Y02B 10/14* (2013.01); *Y02E 10/563* (2013.01); *Y02E 10/566* (2013.01); *Y02E 60/122* (2013.01); *Y02E 60/126* (2013.01); *Y02E 70/30* (2013.01); *Y10T 307/305* (2015.04)

(58) Field of Classification Search
CPC ........................................................ H02J 1/14
USPC ...................................................... 307/38–39
See application file for complete search history.

(56) References Cited

U.S. PATENT DOCUMENTS 6,404,655 B1 * 6/2002 Welches ............ H02M 7/53875
  363/17
6,522,955 B1 * 2/2003 Colborn .................. H02J 3/005
  307/10.1

(Continued)

FOREIGN PATENT DOCUMENTS

DE  10 2010 062 698  6/2012
EP  2 475 068  7/2012

OTHER PUBLICATIONS

Raphael Hollinger et al., "Storage Study 2013", Jan. 2013, XP055085161, 13 pages (with partial English translation).

*Primary Examiner* — Adi Amrany
(74) *Attorney, Agent, or Firm* — Norton Rose Fulbright US LLP; Gerard Messina

(57) ABSTRACT

An energy store for a photovoltaic system has: a first capacity range which is provided for feeding into the power grid; a second capacity range which is provided for internal consumption and feeding into the power grid; and a third capacity range which is provided for feeding into the power grid.

8 Claims, 6 Drawing Sheets

(56) References Cited

U.S. PATENT DOCUMENTS

| | | | | |
|---|---|---|---|---|
| 6,680,547 B1* | 1/2004 | Dailey | H02J 3/28 | 307/24 |
| 2001/0043050 A1* | 11/2001 | Fisher, Jr. | H02J 7/0068 | 320/101 |
| 2003/0047209 A1* | 3/2003 | Yanai | H02J 3/32 | 136/244 |
| 2008/0046387 A1* | 2/2008 | Gopal | G01D 4/004 | 705/412 |
| 2010/0198421 A1* | 8/2010 | Fahimi | H02J 3/32 | 700/291 |
| 2011/0055036 A1* | 3/2011 | Helfan | G06Q 30/04 | 705/26.1 |
| 2011/0140667 A1* | 6/2011 | Moon | H02J 3/32 | 320/134 |
| 2011/0144822 A1* | 6/2011 | Choi | H02J 3/32 | 700/297 |
| 2011/0304295 A1* | 12/2011 | McNally | H01M 10/46 | 320/101 |
| 2012/0130556 A1 | 5/2012 | Marhoefer | | |
| 2012/0166013 A1* | 6/2012 | Park | H02J 3/383 | 700/297 |
| 2012/0176088 A1* | 7/2012 | Lee | H02J 3/383 | 320/128 |
| 2012/0181864 A1* | 7/2012 | Honma | H01M 10/44 | 307/23 |
| 2012/0197449 A1* | 8/2012 | Sanders | G05B 15/02 | 700/291 |
| 2013/0113413 A1* | 5/2013 | Harty | H01M 10/465 | 320/101 |
| 2013/0127626 A1* | 5/2013 | Yoo | H01M 10/488 | 340/636.19 |
| 2013/0144547 A1* | 6/2013 | Yun | G01R 31/3624 | 702/63 |
| 2013/0154369 A1* | 6/2013 | Kim | H02J 3/28 | 307/26 |
| 2013/0154570 A1* | 6/2013 | Nomura | H02J 3/32 | 320/128 |
| 2013/0204443 A1* | 8/2013 | Steven | G06Q 10/00 | 700/286 |
| 2014/0039709 A1* | 2/2014 | Steven | G06Q 10/06 | 700/291 |
| 2014/0304025 A1* | 10/2014 | Steven | G06Q 10/06314 | 705/7.24 |

* cited by examiner

ENERGY STORE FOR A PHOTOVOLTAIC SYSTEM, ENERGY STORAGE POWER PLANT, CONTROL DEVICE, AND METHOD FOR OPERATING AN ENERGY STORE

BACKGROUND OF THE INVENTION

1. Field of the Invention

The present invention relates to an energy store for a photovoltaic system, an energy storage power plant, a control device, and a method for operating an energy store.

2. Description Of The Related Art

Conventional electrical power grids are based on a few centralized power plants which supply the end consumers with the aid of the installed transmission and distribution networks. This traditional system has served society well in providing a stable and reliable power supply. However, the increasingly intense political and environmental pressure to expand the use of renewable energy sources requires a new model of supplying power. This new power supply system must be flexible and intelligent so that is able to deliver quantities of power of any quality and magnitude from the various sources, and to control these as needed so that a reliable supply to the consumers is ensured at all times.

In the past, research and development has concentrated primarily on environmentally friendly power generation and intelligent measuring and information technology. However, it is becoming increasingly clear that for an optimal power supply, use should also be made of an energy store that is able to temporarily store power from renewable energies and feed it into the power grid as needed.

Based on service life considerations, an energy store should be operated only in certain states of charge (SOC) or within a charging window. Depending on the type of energy store, there are low and/or high states of charge in which the energy store should not be operated. Typical values are approximately 20% to 50% of nominal capacity, depending on the battery type.

Published German patent application document DE 10 2010 062 698 A1 relates to a photovoltaic module and a method for controlling a photovoltaic module. This photovoltaic module, having a connection for the direct energy supply to a customer, includes a controller having a switch for activating and deactivating the direct power supply. The controller also includes a telecommunication module which is coupled to the switch and is dialable by the customer via telephone, the telecommunication module being designed to control the switch and to allow activation and deactivation of the power supply as needed.

BRIEF SUMMARY OF THE INVENTION

The present invention provides an energy store for a photovoltaic system, having a first capacity range which is provided, preferably exclusively, for feeding into the power grid, having a second capacity range which is provided for internal consumption and feeding into the power grid, and having a third capacity range, different from the first capacity range, which is provided, preferably exclusively, for feeding into the power grid.

In addition, a virtual energy storage power plant is provided, having a plurality of energy stores according to the present invention which are coupled to a central control device, the central control device being designed to set a positive or negative energy quantity for feeding into the power grid for a time window at a specific time for an individual energy store and/or a group of the plurality of energy stores.

Moreover, a method is provided for operating an energy store according to the present invention, having the following method steps:

measuring an actual state of charge of the energy store;

setting a positive or negative energy quantity of the energy store for feeding into the power grid for a time window at a specific time;

adjusting the actual state of charge of the energy store, using the first capacity range, the second capacity range, and the third capacity range of the energy store, at the specific time in such a way that the energy quantity for feeding into the power grid is providable by the energy store for the time window at the specific time.

The finding on which the present invention is based is to make the ranges of the capacity of the energy store, which are normally unutilized, usable for network services which are primarily focused on paid service delivery, for example a minute reserve within one-hour time slices. For these network services, the operator of the energy store must guarantee a positive power, i.e., feeding of electrical power from the energy store into the public power grid, or a negative power, i.e., receiving power from the public power grid. For the most part, however, only small energy quantities are requested. These power-based network services in brief time slices may thus be provided in a low and/or high state of charge range, i.e., in the first and third capacity ranges of the energy store, with few adverse effects on the service life of the energy store.

Due to the required high power values for network services, the decentralized energy stores may be operated as a virtual energy storage power plant in the virtual network.

The advantage of the present invention lies in the cost-effective utilization of low and/or high capacity ranges for power-based network services in brief time slices which are not usable during normal operation. Additional revenue may thus be generated, and therefore the capital expenditures in the energy store and the photovoltaic system may be paid off earlier.

In one advantageous specific embodiment, a fourth capacity range and a fifth capacity range, which are blocked, are provided in the energy store. The fourth capacity range and the fifth capacity range are not usable for either normal operation or for feeding into the power grid. For example, the fourth capacity range is provided in the lower capacity range of the energy store, and the fifth capacity range is provided in the upper capacity range of the energy store. For example, the fourth capacity range is 0% to 10%, and the fifth capacity range is 90% to 100%, of the capacity of the energy store. The service life and the power of the energy store may be significantly improved due to this design of the energy store.

The blocked capacity ranges, i.e., the fourth and fifth capacity ranges, are not enabled for either normal operation or for network services. The capacity ranges having limited enablement, i.e., the first and the third capacity ranges, are enabled only for power-related network services in a brief time slice. The enabled capacity range, i.e., the second capacity range, corresponds to the range which is usable by the energy store providers for normal operation and optionally for network operation according to data sheet specifications.

In another specific embodiment of the present invention, the energy store has a control device which is designed to adjust an actual state of charge of the energy store in such a way that a set positive or negative energy quantity for feeding into the power grid is providable by the energy store for a set time window at a set time.

In another specific embodiment, the control device is designed to adjust the actual state of charge of the energy store, taking into account past load curves of the internal consumption and/or a yield projection of the photovoltaic system. The energy store may be operated more efficiently and cost-effectively in this way.

In another specific embodiment, the first capacity range is 10% to 40% of the capacity of the energy store, the second capacity range is 40% to 80% of the capacity of the energy store, and the third capacity range is 80% to 90% of the capacity of the energy store. Other ranges are likewise possible, and may be adjusted, depending on the design of the energy store. For example, for an energy store designed as a lithium-ion accumulator, the first capacity range may be 20% to 50%, the second capacity range 50% to 70%, and the third capacity range 70% to 80%, of the capacity of the energy store.

In another specific embodiment, the energy store is designed as an electrical accumulator, in particular as a lead accumulator or as a lithium-ion accumulator. An energy store designed as a lead accumulator provides a good cost-to-performance ratio, and is very reliable with appropriate maintenance and upkeep. An energy store designed as a lithium-ion accumulator has the advantage of high power capability with good efficiency and a long service life.

According to another specific embodiment of the present invention, the energy store is designed as an electrical accumulator, for example as a lead-acid-accumulator, a lead gel accumulator, a lead-fleece accumulator, a Li-ion/lithium-cobalt dioxide accumulator, a lithium polymer accumulator, a lithium-manganese accumulator, a lithium-iron phosphate accumulator, a lithium-iron-yttrium phosphate accumulator, a lithium titanate accumulator, a lithium-sulfur accumulator, a lithium metal-polymer accumulator, a sodium-nickel chloride high-temperature battery, a sodium-sulfur accumulator, a nickel-cadmium accumulator, a nickel-iron accumulator, a nickel-hydrogen accumulator, a nickel-metal hydride accumulator, a nickel-zinc accumulator, a lead accumulator, a silver-zinc accumulator, a vanadium redox accumulator, and/or a zinc-bromine accumulator.

In another specific embodiment, the control device has a communication interface which is coupled to the central control device. The central control device may thus request a network service with the aid of a handshake function for a plurality of decentralized energy stores. The control devices of the energy stores report back the available power and time slice, and guarantee the availability for a certain point in time, for example a 5-kW minute reserve for one hour on the day following the request. The second capacity range may also be used during normal operation. In this case, however, the state of charge of the energy store must be regulated in such a way that the guaranteed power is providable. The decision for or against the use of the second capacity range of the normal operation could be specified by load curve and weather forecasts.

In another specific embodiment, the first and the third capacity ranges are enabled or blocked taking into account a condition, for example a measured value or a predefined threshold value of the service fee of the network service. For example, a user of the energy store may establish a threshold value in the control device of the energy store, above which the first and third capacity ranges are usable. The energy store may thus be operated in a particularly convenient and cost-effective way.

The above embodiments and refinements may be arbitrarily combined with one another if this is meaningful. Further possible embodiments, refinements, and implementations of the present invention also include combinations, even if not explicitly mentioned, of features of the present invention described above or below with regard to the exemplary embodiments. In particular, those skilled in the art will also add individual aspects as improvements or supplements to the particular basic form of the present invention.

DETAILED DESCRIPTION OF THE INVENTION

Figure 1:
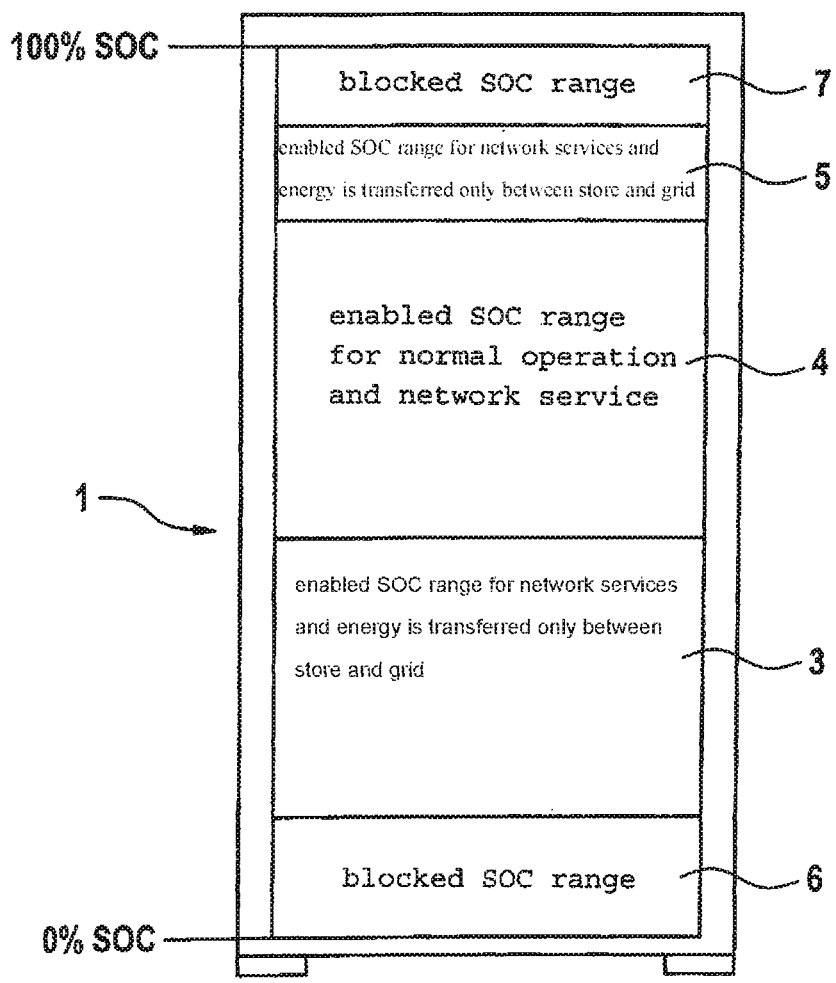
FIG. 1 shows a schematic illustration of an energy store according to one specific embodiment of the present invention.

Unless stated otherwise, identical or functionally equivalent elements and devices are provided with the same reference numerals in all of the figures.

FIG. 1 shows a schematic illustration of an energy store 1 according to one specific embodiment of the present invention. Energy store 1 is, for example, an electrical accumulator for a photovoltaic system 2. Energy store 1 has a capacity which indicates the quantity of electrical charge which the energy store is able to store. For example, the energy store illustrated in FIG. 1 is a lithium-ion accumulator and has a capacity of 10 kWh. A scale is schematically illustrated on the left side of energy store 1 which represents the state of charge of energy store 1 in percent. When energy store 1 has a state of charge of 50%, for example, 5 kWh are stored in the energy store.

Energy store 1 has a first capacity range 3 which is provided for feeding into the power grid. This means that this capacity range 3 is reserved for feeding into the power grid. Thus, first capacity range 3 cannot be used for internal consumption. First capacity range 3 has, for example, a capacity range of approximately 10% to 40% of the instantaneous total capacity of energy store 1.

In addition, energy store 1 has a second capacity range 4 which is usable for network services as well as for temporary storage of electrical power for internal consumption. In the present specific embodiment, second capacity range 4 has, for example, a capacity range of 40% to 80% of the instantaneous total capacity of energy store 1.

Furthermore, energy store 1 has a third capacity range 5 which is provided solely for feeding into the power grid. This capacity range 5, the same as the first capacity range, is provided for network services, for example for positive or negative feeding of electrical power into the power grid. Third capacity range 5 has, for example, a capacity range of 80% to 90% of the capacity of energy store 1.

In addition, energy store 1 has a fourth capacity range 6 and a fifth capacity range 7. Fourth capacity range 6 has, for example, a capacity range of 0% to 10%, and the fifth capacity range has, for example, a capacity range of 90% to 100%, of the instantaneous total capacity of energy store 1. Fourth capacity range 6 and fifth capacity range 7 are not usable either for network services, for example positive or negative feeding of electrical power into the public power grid, or for temporarily storing power for internal consumption. Charging or discharging energy store 1 to these capacity ranges would significantly reduce the service life and the power of energy store 1.

Figure 2:
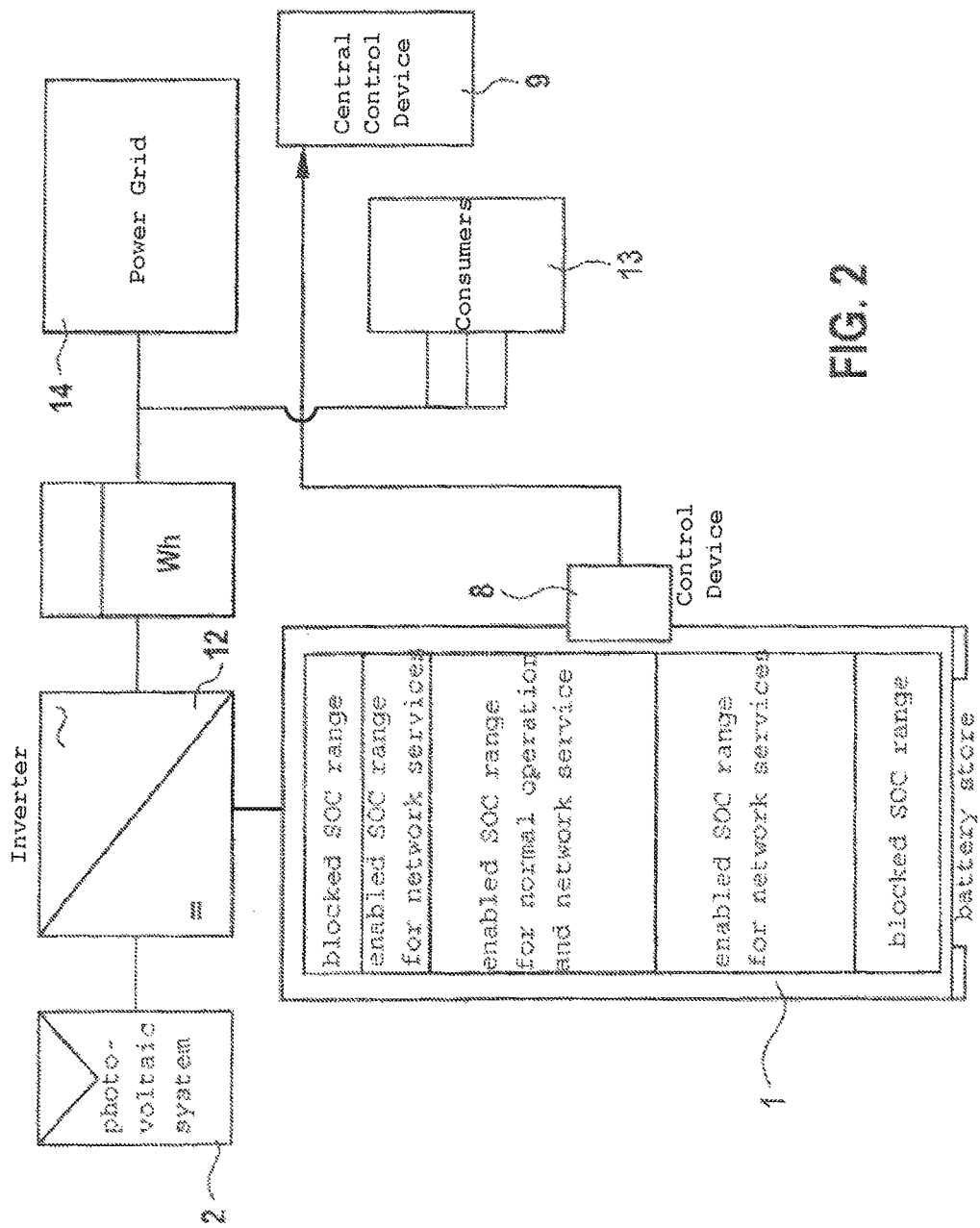
FIG. 2 shows a schematic illustration of an energy store of a photovoltaic system according to one specific embodiment of the present invention.

FIG. 2 shows a schematic illustration of an energy store 1 together with a photovoltaic system 2 according to one specific embodiment of the present invention. In this case, energy store 1 is part of a photovoltaic system of a building. Energy store 1 is coupled to a photovoltaic system 2, and is designed to temporarily store the electrical power generated by the photovoltaic system, and to deliver this electrical power as needed to consumers 13 coupled to energy store 1.

In addition, energy store 1 is coupled to a public power grid 14 via an inverter 12. It is thus possible to feed electrical power which is produced by photovoltaic system 2 or temporarily stored in energy store 1 into public power grid 14, or to withdraw electrical power from public power grid 14 and store it in energy store 1.

Furthermore, energy store 1 has a control device 8 which is designed to adjust an actual state of charge of energy store 1 in such a way that a set positive or negative energy quantity is providable by energy store 1. For example, a user or a central control device 9 may communicate with control device 8 of energy store 1 and request a positive or negative network service, for example.

Figure 3:
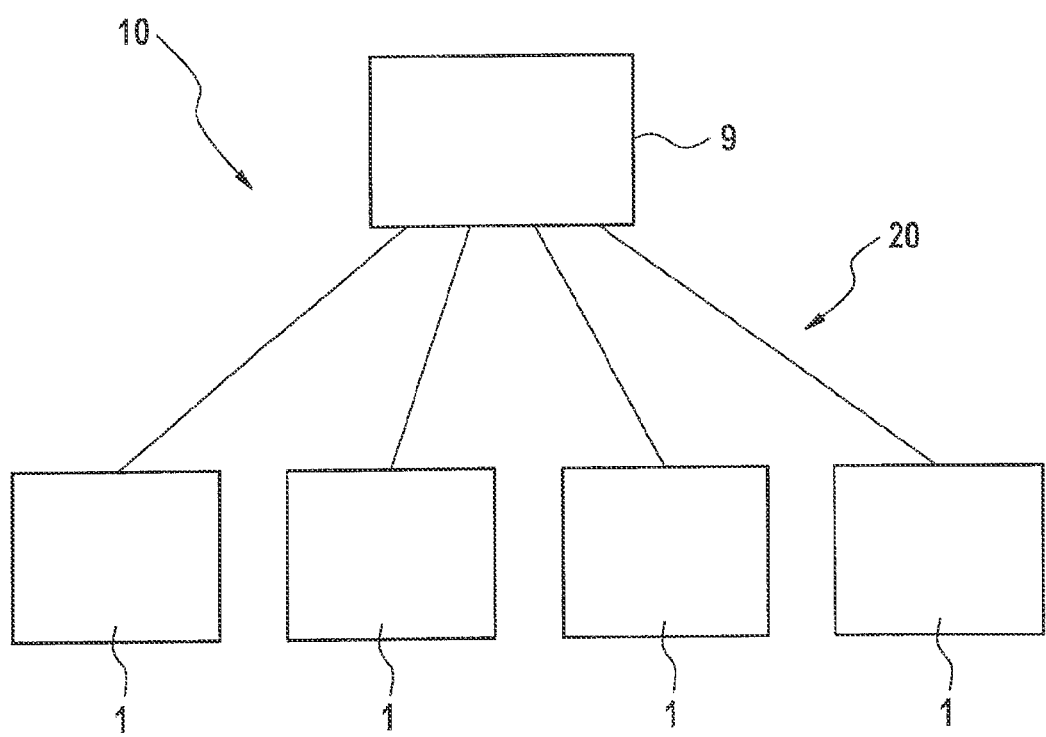
FIG. 3 shows a schematic illustration of an energy storage power plant according to one specific embodiment of the present invention.

FIG. 3 shows a schematic illustration of a virtual energy storage power plant 10 according to one specific embodiment of the present invention. Virtual energy storage power plant 10 includes a plurality of decentralized energy stores 1 which are coupled to a central control device 9 via a communication network 20. Central control device 9 requests a network service with the aid of a handshake function for the plurality of decentralized energy stores 1. Control devices 8 of energy stores 1 report back the available power and a time window, and guarantee the availability for a certain point in time, for example a 10-kW minute reserve for four hours on the day following the request. The total power which is to be provided for the network service may be significantly increased by a network of a plurality of energy stores 1. It is thus possible to provide network services in the megawatt range.

Figure 4:
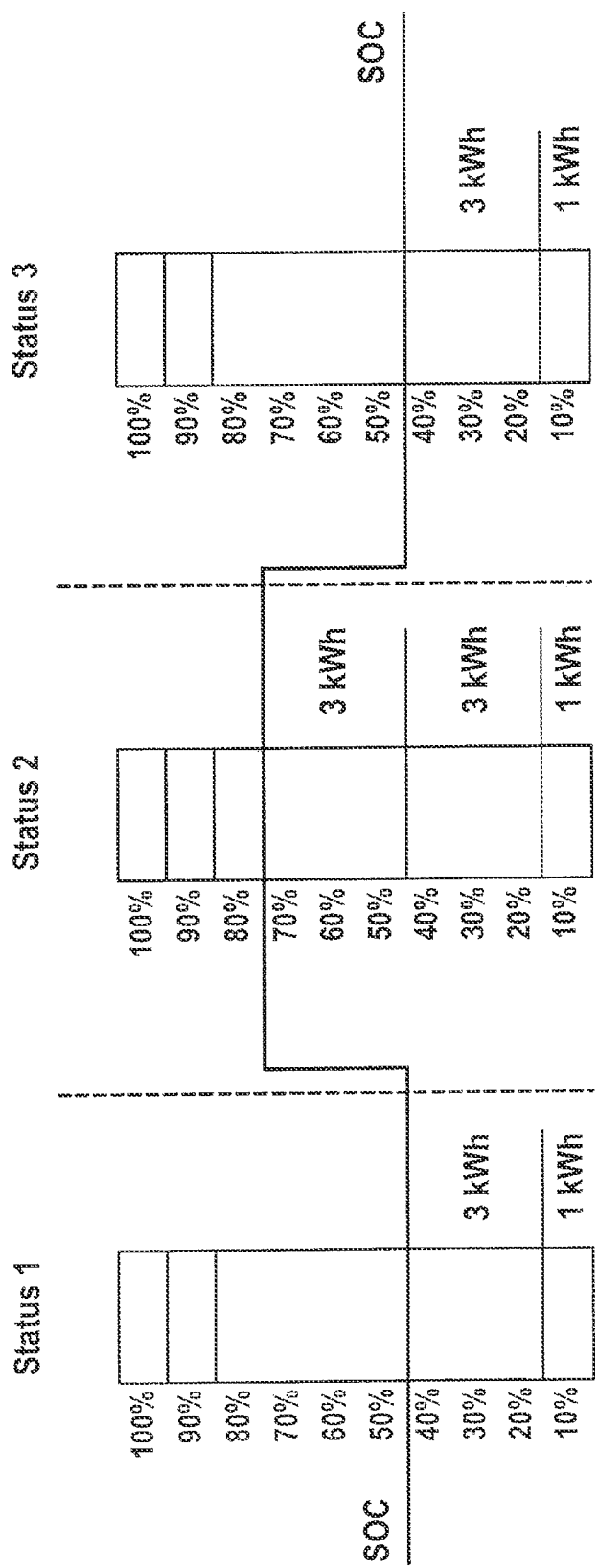
FIG. 4 shows a schematic diagram which illustrates the change over time of the state of charge of an energy store according to one specific embodiment of the present invention.

FIG. 4 shows a schematic diagram which illustrates the change over time of the state of charge of an energy store 1 according to one specific embodiment of the present invention. In status 1, energy store 1 has a state of charge of 40% of the capacity of the energy store. A request for positive feeding of power into the power grid is made of central control device 9 in status 1. Central control device 9 requests from energy store, for example, that a power of 3 kW is to be provided by energy store 1 within a time window of one hour at 6 a.m. of the following day. Control device 8 of energy store 1 acknowledges this request, and guarantees central control device 9 that at 6 a.m. of the following day a power of 3 kW is providable by energy store 1 for a period of one hour.

Energy store 1 is charged, for example by power from photovoltaic system 2 and/or by the public power grid, in status 2. For example, energy store 1 may be charged by cost-effective off-peak power. The state of charge of energy store 1 after charging is 70% of the instantaneous total capacity of energy store 1. Control device 8 of energy store 1 controls the state of charge of energy store 1 in such a way that the requested power may be provided for a set time period at the set time.

Electrical power is fed from energy store 1 into the public power grid in status 3. The requested power of 3 kW is completely fed into the public power grid over a period of one hour, beginning at 6 a.m. The state of charge of energy store 1 after discharging is 40% of the instantaneous total capacity of energy store 1.

Figure 5:
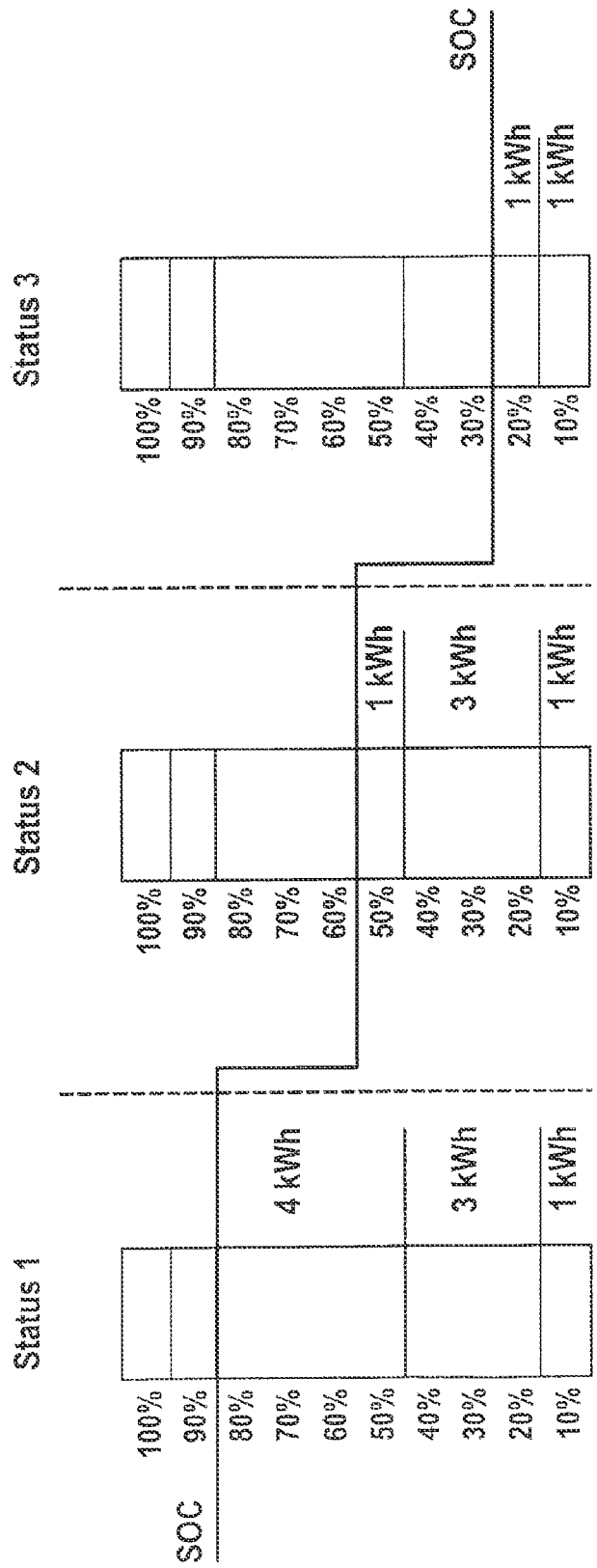
FIG. 5 shows a schematic diagram which illustrates the change over time of the state of charge of an energy store according to another specific embodiment of the present invention.

FIG. 5 shows a schematic diagram which illustrates the change over time of the state of charge of an energy store 1 according to one specific embodiment of the present invention.

The state of charge of energy store 1 is 80% in status 1. A request for positive feeding of power into the power grid is made of central control device 9 in status 1. Central control device 9 requests from energy store 1, for example, that a power of 1.5 kW is to be provided by energy store 1 within a time window of two hours at noon of the following day. Control device 8 of energy store 1 acknowledges this request, and guarantees central control device 9 that at noon of the following day a power of 1.5 kW is providable by energy store 1 for a period of two hours.

In status 2, energy store 1 is discharged by the consumers coupled to energy store 1. This consumption is referred to as internal consumption. As is apparent from the figure, the internal consumption takes place solely in second capacity range 4 of energy store 1 provided for internal consumption.

Electrical power is fed from energy store 1 into the public power grid in status 3. The requested power of 1.5 kW is completely fed into the public power grid over a period of two hours, beginning at noon. The state of charge of energy store 1 after discharging is 20% of the instantaneous total capacity of energy store 1.

Figure 6:
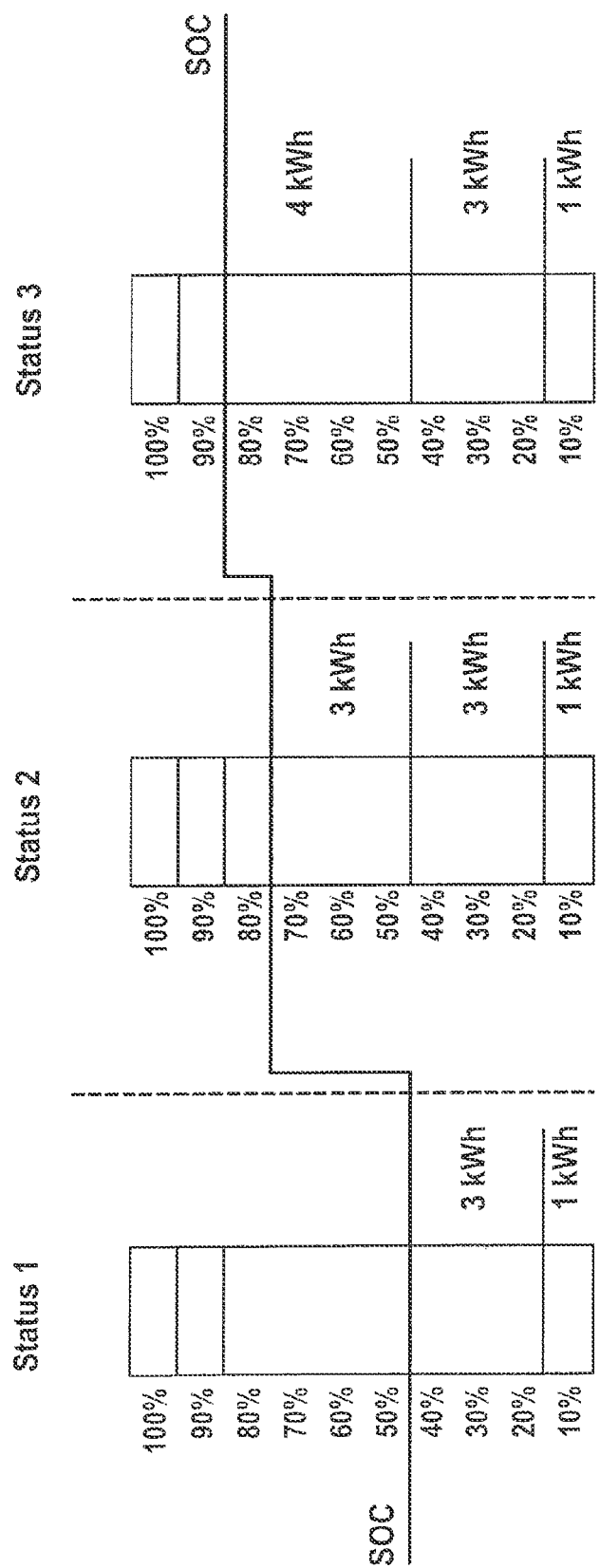
FIG. 6 shows a schematic diagram which illustrates the change over time of the state of charge of an energy store according to another specific embodiment of the present invention.

FIG. 6 shows a schematic diagram which illustrates the change over time of the state of charge of an energy store 1 according to one specific embodiment of the present invention.

The state of charge of the energy store is 40% in status 1. A request for negative feeding of power into the power grid is made of central control device 9 in status 1. This means that energy store 1 is to receive power from the network and temporarily store it. Central control device 9 requests from energy store 1, for example, that a power of 1 kW is to be received by energy store 1 within a time window of three hours at 2 a.m. of the following day. Control device 8 of energy store 1 acknowledges this request, and guarantees central control device 9 that at 2 a.m. of the following day a power of 1 kW will be stored by the energy store over a period of three hours.

In status 2, energy store 1 is charged by photovoltaic system 2 which is coupled to energy store 1. The state of charge of energy store 1 after charging is 80% of the total capacity.

Electrical power is received by energy store 1 from the public power grid in status 3. The requested negative power of 1 kW is completely stored by energy store 1 over a period of one hour, beginning at 2 a.m. The state of charge of energy store 1 after receiving the power from the public power grid is 80% of the instantaneous total capacity of energy store 1.

Although the present invention has been described above with reference to preferred exemplary embodiments, it is not limited thereto, and may be modified in numerous ways. In particular, the present invention may be changed or modified in various ways without departing from the core of the present invention.

For example, the energy store may also be used for other power plants which recover electrical power from renewable energies.

For example, the energy store according to the present invention could also be used with a hydroelectric power plant or a wind power plant.

What is claimed is:

1. An energy store, comprising:
   at least one interface by which charge is provided to locally connected power consumption devices and by which charge is provided to and received from a power grid, wherein the energy store receives and stores charge from a photovoltaic system; and
   a control device that:
   measures an actual state of charge of the energy store;
   in a first capacity range of the energy store, transfers energy only between the energy store and the power grid;
   in a second capacity range of the energy store, transfers energy from the energy store to the locally connected power consumption devices and transfers energy between the energy store and the power grid; and
   in a third capacity range of the energy store, transfers energy only between the energy store and the power grid, wherein the first capacity range, the second capacity range and the third capacity range are mutually exclusive, wherein:
   the first capacity range is between a first level and a second level,
   the second capacity range is below a third level and above the second level,
   the third capacity range is below a fourth level and above the third level, and
   each of the first, second, and third capacity ranges corresponds to a respective state of charge of the energy store.

2. The energy store as recited in claim 1, wherein, in each of a fourth capacity range of the energy store and a fifth capacity range of the energy store, the control device blocks transfer of energy between the energy store and the power grid and blocks provision of energy from the energy store to the locally connected power consumption devices.

3. The energy store as recited in claim 2, wherein the control device adjusts an actual state of charge of the energy store in such a way that a predefined energy quantity is transferred between the power grid and the energy store for a predefined time window at a predefined time, wherein the predefined time window and the predefined time are specified in an energy transfer request received by the control device.

4. The energy store as recited in claim 3, wherein the control device adjusts the actual state of charge of the energy store by taking into account at least one of (i) past load curves of energy consumption by the locally connected power consumption devices and (ii) a yield projection of the photovoltaic system.

5. The energy store as recited in claim 4, wherein (i) the first capacity range is approximately 10% to 40% of the capacity of the energy store; (ii) the second capacity range is from just above the first capacity range to approximately 80% of the capacity of the energy store; and (iii) the third capacity range is from just above the second capacity range to approximately 90% of the capacity of the energy store.

6. The energy store as recited in claim 5, wherein the energy store is an electrical accumulator in the form of one of a lead accumulator or a lithium-ion accumulator.

7. The energy store as recited in claim 2, wherein the control device includes a communication interface coupled to a central control device, wherein the control device receives through the communication interface a request for a set quantity of energy to be transferred between the energy store and the power grid, and wherein the control device responds to the request by enabling or blocking transfer of the requested quantity of energy according to the first, second, third, fourth and fifth capacity ranges.

8. The energy store as recited in claim 7, wherein the control device responds to the request by reporting to the central control device an amount of available power and a time window during which the available power is guaranteed to be available.

* * * * *